United States Patent
Hammon et al.

(10) Patent No.: US 7,540,884 B2
(45) Date of Patent: Jun. 2, 2009

(54) METHOD FOR PERFORMING THE PURIFYING SEPARATION OF CRYSTALS OUT THEIR SUSPENSION IN A MOTHER LIQUOR

(75) Inventors: Ulrich Hammon, Mannheim (DE); Dieter Baumann, Frankenthal (DE); Joerg Heilek, Bammental (DE); Klaus Joachim Mueller-Engel, Stutensee (DE); Bernd Eck, Viernheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 367 days.

(21) Appl. No.: 10/494,721

(22) PCT Filed: Nov. 8, 2002

(86) PCT No.: PCT/EP02/12497

§ 371 (c)(1),
(2), (4) Date: May 6, 2004

(87) PCT Pub. No.: WO03/041832

PCT Pub. Date: May 22, 2003

(65) Prior Publication Data

US 2004/0256319 A1  Dec. 23, 2004

(30) Foreign Application Priority Data

Nov. 15, 2001  (DE)  ................. 101 56 016
May 24, 2002  (DE)  ................. 102 23 058

(51) Int. Cl.
*B01D 9/00* (2006.01)
(52) U.S. Cl. ................. 23/295 R; 23/296; 62/532; 62/540; 62/542; 62/544; 210/774; 422/245.1; 422/252; 562/598; 562/600; 585/812

(58) Field of Classification Search ................. 210/634, 210/774; 23/295 R, 296, 297, 299; 422/245.1, 422/251, 252, 254; 585/812; 562/600, 598; 62/532, 540, 542, 544
See application file for complete search history.

(56) References Cited

U.S. PATENT DOCUMENTS 2,747,001 A  5/1956  Weedman et al.
2,765,921 A  10/1956  Green et al.

(Continued)

FOREIGN PATENT DOCUMENTS

CH  535 058  3/1973

(Continued)

OTHER PUBLICATIONS

P.J. Jansens, et al. "The purification process in hydraulic packed-bed wash columns", Chemical Engineering Science, vol. 50, No. 17, pp. 2717-2729 1995.

(Continued)

*Primary Examiner*—Joseph W Drodge
(74) *Attorney, Agent, or Firm*—Oblon, Spivak, McClelland, Maier & Neustadt, P.C.

(57) ABSTRACT

A process for purifying removal of crystals from their suspension in mother liquor by means of a washing column having forced transport in which the process chamber is encased by a metal wall which, on its side facing away from the process chamber, is heated at least along the length of the pure melt zone.

6 Claims, 5 Drawing Sheets

U.S. PATENT DOCUMENTS

| | | | |
|---|---|---|---|
| 2,851,368 A | | 9/1958 | Findlay et al. |
| 2,854,494 A | | 9/1958 | Thomas et al. |
| 2,912,469 A | * | 11/1959 | Wiegandt .................... 570/211 |
| 3,222,880 A | * | 12/1965 | Findlay ........................ 62/540 |
| 3,261,170 A | * | 7/1966 | McCarthy et al. ............. 62/538 |
| 3,375,082 A | * | 3/1968 | Roderich .................. 23/295 R |
| 3,770,386 A | * | 11/1973 | Hayashi et al. ............. 422/273 |
| 3,777,892 A | | 12/1973 | Thijssen et al. |
| 3,872,009 A | | 3/1975 | Thijssen |
| 4,279,130 A | | 7/1981 | Finch et al. |
| 4,453,959 A | * | 6/1984 | Bishkin ........................ 62/542 |
| 4,597,768 A | | 7/1986 | Thijssen et al. |
| 4,632,809 A | | 12/1986 | Otto et al. |
| 5,090,965 A | * | 2/1992 | Kehm et al. .................. 23/295 R |
| 7,112,695 B2 | * | 9/2006 | Eck et al. .................... 562/600 |
| 2003/0060661 A1 | | 3/2003 | Eck et al. |

FOREIGN PATENT DOCUMENTS

| | | |
|---|---|---|
| DE | 100 17 903 | 10/2001 |
| DE | 100 36 880 | 2/2002 |
| DE | 100 36 881 | 2/2002 |
| EP | 0 083 463 | 7/1983 |
| EP | 0 097 405 | 1/1984 |
| EP | 0 098 637 | 1/1984 |
| EP | 0 305 316 | 3/1989 |
| EP | 0 398 437 | 11/1990 |
| WO | 01/77056 | 10/2001 |

OTHER PUBLICATIONS

D. Verdoes, et al. "Improved procedures for separating crystals from the melt", Applied Thermal Engineering, vol. 17, Nos. 8-10, pp. 879-888 1997.

Letter of Rene Klomp (Niro Process Technology) to Mr. Baumann (BASF), dated May 11, 1999.

Brochure, "Crystallization and wash column separation set new standards in purity of chemical compounds," Niro Process Technology B. V., Nov. 27, 2006, pp. 1-6.

McKay, D. L., et al., "Continuous fractional crystallization," Chemical Engineering Progress, vol. 61, No. 11, Nov. 1965, pp. 99-104.

Oord-Knol, L. V., "Hydraulic Wash Columns Solid-Liquid Separation in Melt Crystallization," Universal Press, 2000, ISBN 9080570915, pp. 22-24.

Arkenbout, G. F., "Melt Crystallization Technology," Technomic Publishing Co., 1995, ISBN 1566761816, pp. 271-277.

Perry's Chemical Engineer Handbook, 7th Ed. (ed. R. H. Perry, D. W. Green), McGraw-Hill Professional, 1997, ISBN 0070498415, pp. 10-133-10-137.

Verdoes, D. et al., "Comparison of Melt Crystallization Processes for the Purification of Caprolactam," Proceeding of the 13th Symposium on Industrial Crystallization, Sep. 16-19, 1996, pp. 767-772.

Jansens, P. J., "Fractional Suspension Crystallization of Organic Compounds," Universal Press, 1994, ISBN 9037000975, pp. 60, 126-129, 138-144, and 148.

Fax letter of Mr. Ray Ruemekorf (Niro Process Technology) to Mr. Baumann, dated Jun. 22, 1999.

Declaration of Mr. Ray Ruemekorf, Nov. 22, 2006.

* cited by examiner

METHOD FOR PERFORMING THE PURIFYING SEPARATION OF CRYSTALS OUT THEIR SUSPENSION IN A MOTHER LIQUOR

The present invention relates to a process for purifying removal of crystals from their suspension in mother liquor, in which
- the suspension is fed to a washing column which has a wall which encloses a process chamber,
- mother liquor from the suspension fed into the process chamber is passed out of the process chamber while holding back the crystals and forming a crystal begin the process chamber,
- the crystal bed is conveyed within the process chamber,
- at least one force other than gravity acts in the process chamber in the conveying direction of the crystal bed and conveys the crystal bed within the process chamber, and
- pure melt comprising molten crystals which have been purifyingly removed by the process is conducted in the process chamber in countercurrent to the crystal bed in such a manner that a washing front forms in the crystal bed which divides the crystal bed into a mother liquor zone and a pure melt zone.

In this document, the term mother liquor should be understood in such a way that it encompasses melts of the component to be crystallized and impurities and/or solutions of the component to be crystallized and solvents or solvent mixtures and also impurities. The component to be crystallized in the process according to the invention, in contrast, for example, to concentration processes for aqueous fruit juices, is always the target product of value to be prepared in pure form.

In particular, the present invention relates to the purifying removal of acrylic acid crystals from their suspension in contaminated acrylic acid.

The numerical addresses in this document always refer to the figures accompanying this document.

The process according to the preamble of this document is known (cf., for example, EP-A 83463, DE-A 10017903, DE-A 10036881, DE-A 10036880, EP-A 97405, DE-A 10017903, WO-0177056, EP-A 398437, EP-A 98637, EP-A 305316, U.S. Pat. No. 3,872,009 and U.S. Pat. No. 3,777, 892).

The process generally follows a suspension crystallization which provides a very effective and cost-effective process to achieve a high purity of a desired chemical compound. This utilizes the substantial expulsion of impurities from the crystal lattice when crystals grow in a liquid, and the impurities remain in the mother liquor. Even in a one-stage crystallization process, highly pure crystals of the desired compound are therefore obtained. If required, the suspension crystallization may be carried out in more than one stage.

A decisive step which considerably influences the purity of the crystallized target product is the removal of the highly pure crystals by a solid-liquid separating process from their mother liquor which comprises the impurities in concentrated form and the uncrystallized fractions of the target product. This separating process may proceed in more than one stage and at least the last stage is often carried out using a washing column. However, the washing column may also form the only separating stage. The washing column substantially has the task of separating the comparatively pure crystal phase from the comparatively impure mother liquor.

Washing columns are likewise disclosed by the prior art. They comprise one, generally cylindrical wall which bounds a process chamber. Upstream of the process chamber is frequently a distributor chamber into which the crystal suspension to be separated in the washing column is fed. On its way from the distributor chamber into the process chamber, the crystal suspension is substantially evenly distributed over the cross section of the process chamber. In the process chamber, withdrawal of mother liquor generates a more dense crystal bed which is conveyed through the process chamber (this may be from the top downward or from the bottom upward). A melt of the molten crystals themselves is passed in countercurrent through the crystal bed as a washing liquid.

There are in principle various useful methods for forming a crystal bed. In gravitationally operating washing columns, the crystal suspension is introduced from above into the column, the crystal bed forms in a sedimentation process and it is conveyed in the conveying direction only by the effect of gravity.

Figure 1:
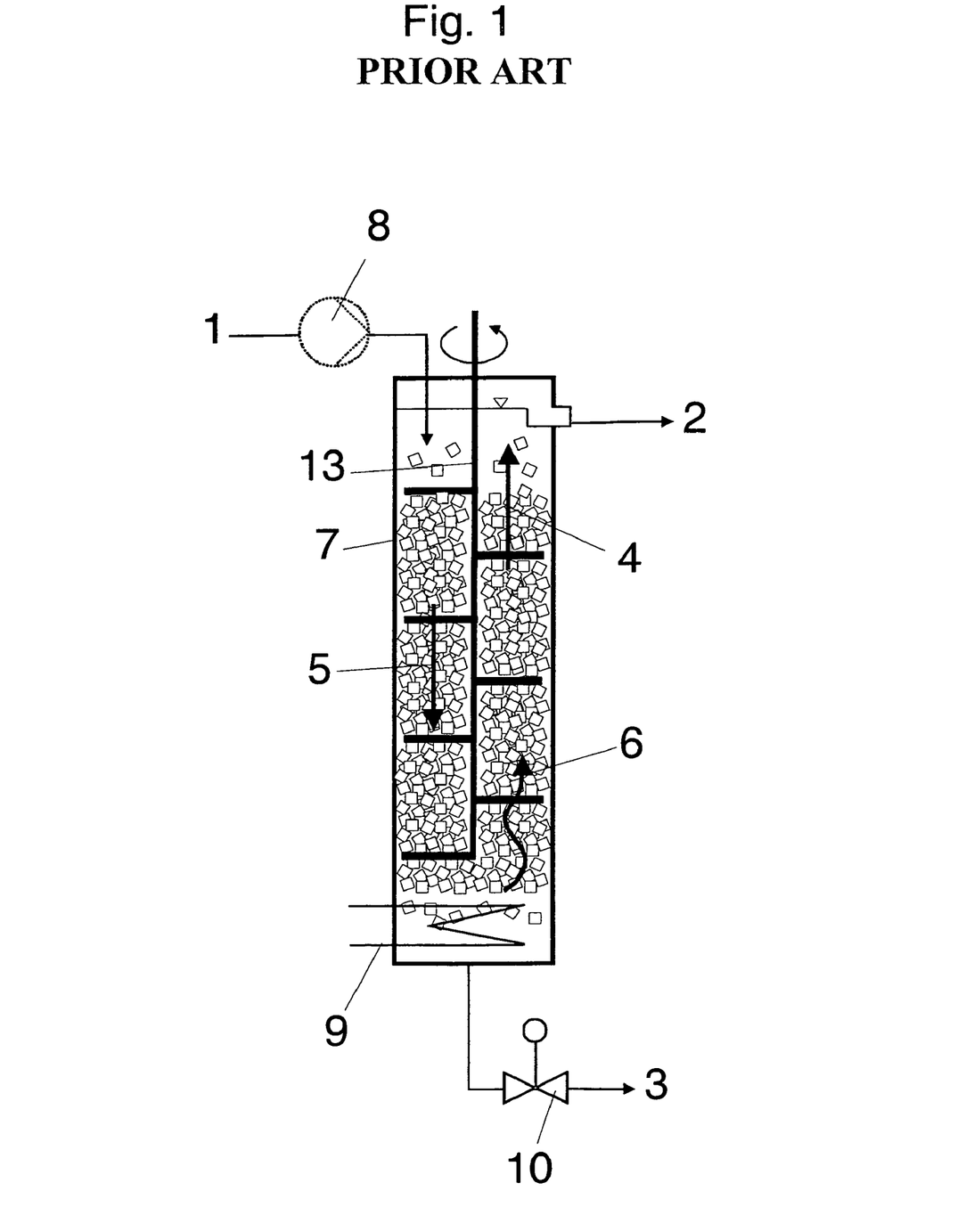

The use of such columns is excluded from the process according to the invention, since in general no defined washing front forms in them. This is true in particular when they are equipped with a stirrer on part of their height (cf. FIG. 1).

The process according to the invention is therefore limited to processes in washing columns having forced conveyance of the crystal bed (a comprehensive description of the different washing column types can be found, inter alia, in Chem.-Ing.-Techn. 57 (1985) No. 291-102, in Chemical Engineering Science Vol. 50, No. 17, p. 2712 to 2729, 1995, Elsevier Science Ltd., in Applied Thermal Engineering Vol. 17, No. 8-10, p. 879-888, 1997, Verlag Elsevier Science Ltd. and in the references cited in the abovementioned references).

Washing columns having forced transport (or conveyance) of the crystal bed are characterized in that a conveying force other than gravity acts in the conveying direction (or transport direction) of the crystal bed.

Figure 2:
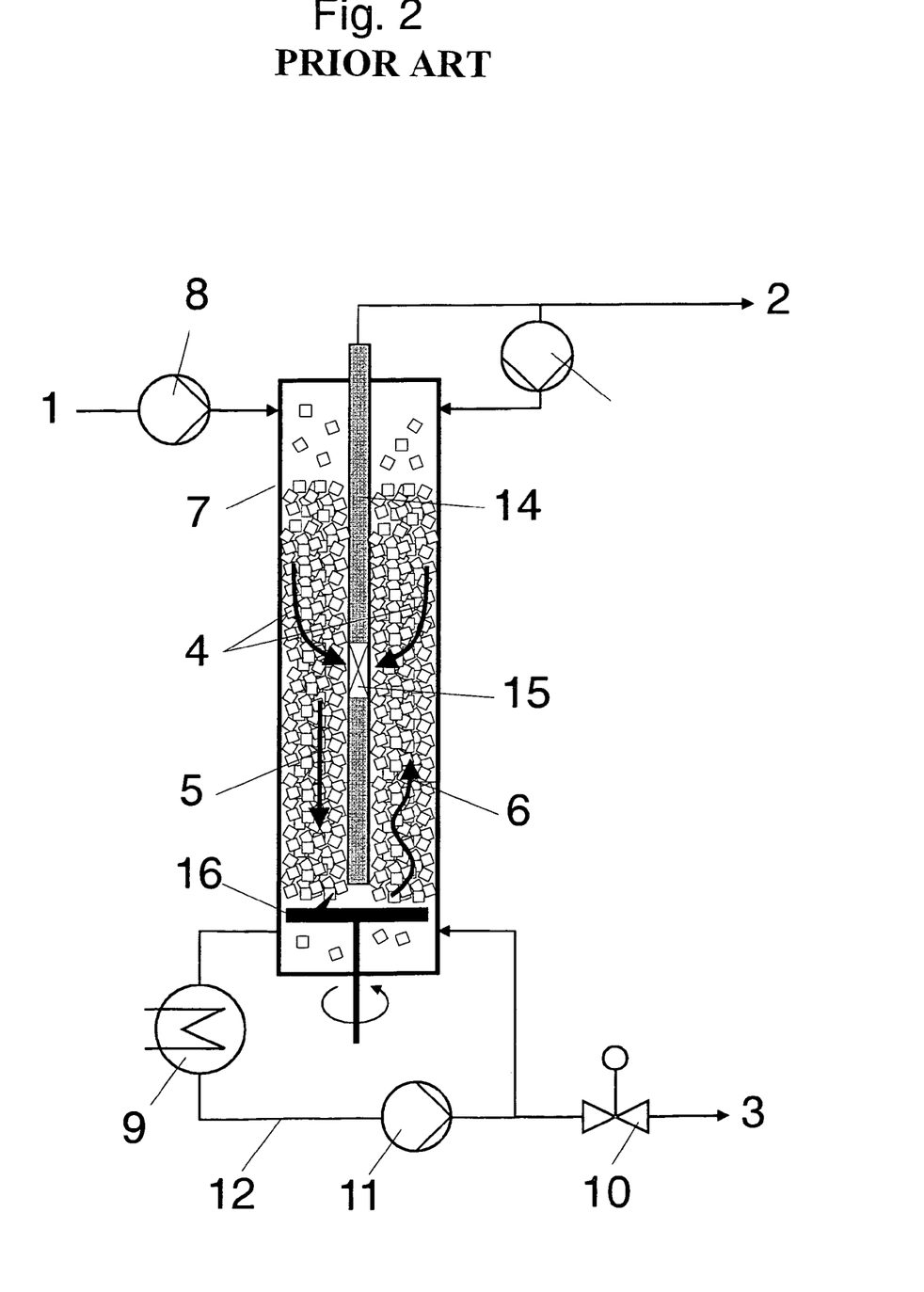

In principle, washing columns having forced transport of the crystal bed are divided into pressure columns (also referred to as hydraulic washing columns or hydraulic columns) and mechanical columns. In pressure columns, the crystal suspension is conveyed within a washing column under pressure (for example by pumping and/or hydrostatic head). The liquid flow imposed by the feed column pressure then ensures compaction of the crystals to a crystal bed (cf. FIG. 2) and also its conveyance (the hydraulic pressure is customarily from 0.1 to 10 bar, frequently from 1 to 5 bar). The mother liquor generally flows off via filters out of the washing column (beyond the filter, the pressure may be atmospheric, subatmospheric or superatmospheric). The recycling of a portion of the mother liquor facilitates the regulation of the transport force (control stream).

Figure 3:
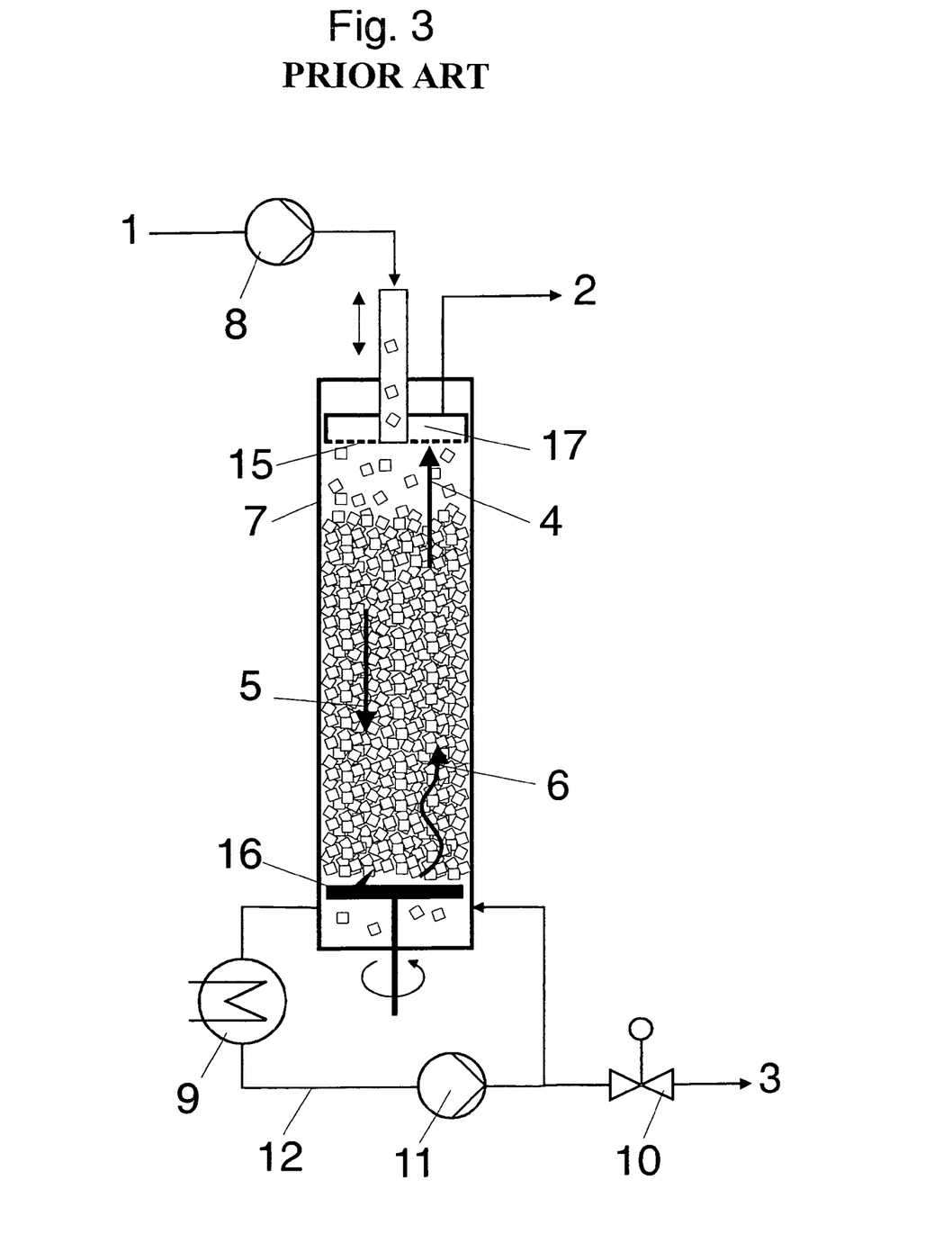

In contrast, mechanical washing columns comprise a mechanical forced conveyance device for the crystals. In the simplest case, this may be a semipermeable piston which is permeable to the mother liquor but impermeable to the crystals in the suspension fed in (cf. FIG. 3) and whose displacement generates the pressure for compressing and conveying the crystal bed.

Figure 4:
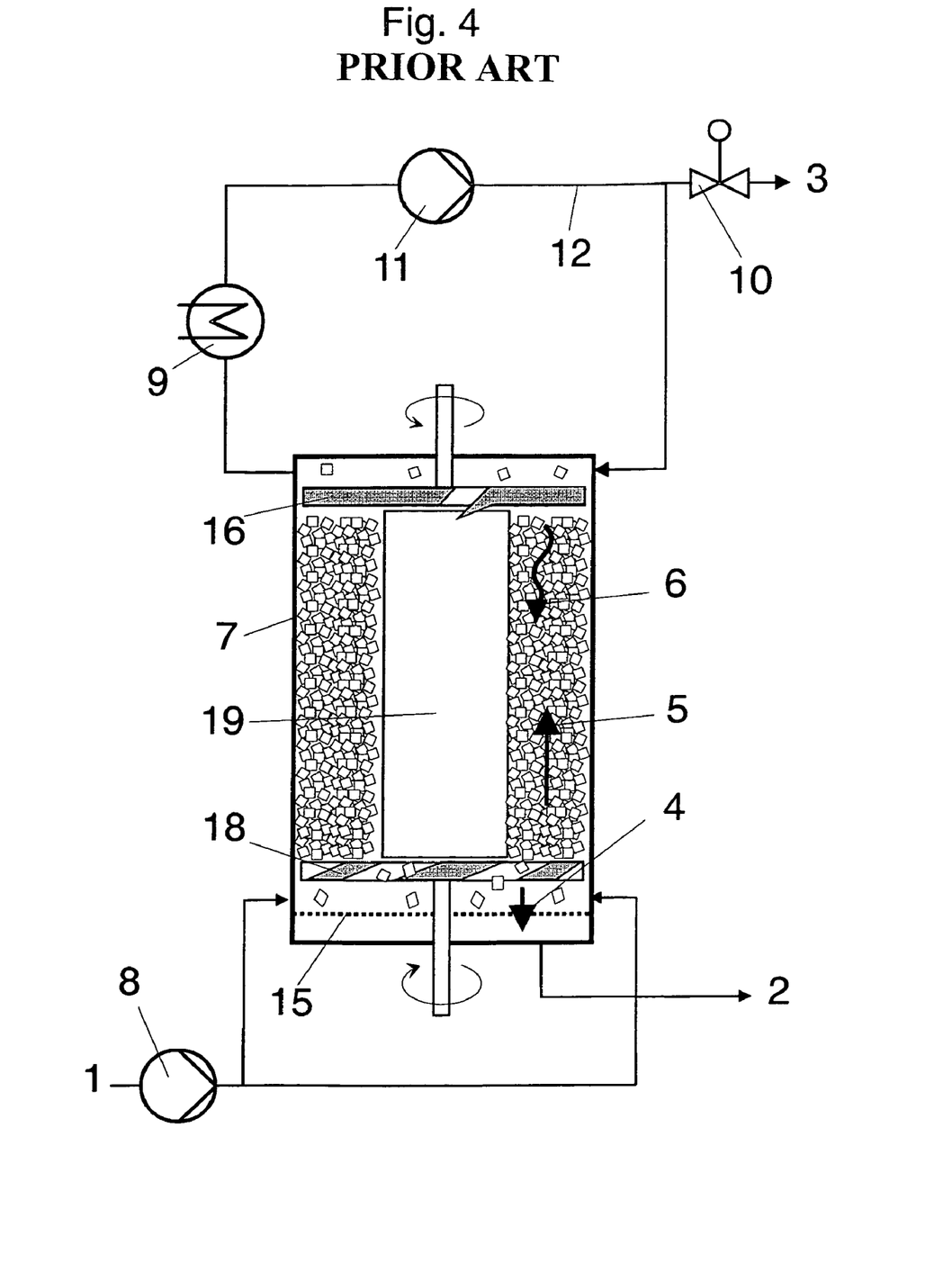

However, the compression to a crystal bed and its conveyance may also be effected by removing the mother liquor via filters and mechanically transporting the crystals from the filter to the crystal bed using a rotating conveying element (for example screw conveyors, stirrers, helices or spirals) (cf. FIG. 4). The filters may also be integrated into the rotating conveying elements. Beyond the mother liquor outlet, the pressure may again also be atmospheric, subatmospheric or superatmospheric.

In the washing columns having forced transport of the crystal bed to be used according to the invention, the crystal bed has a buildup front at which crystals of the crystal suspension fed in continuously accumulate. The buildup front thus marks the transition from the suspension to the crystal bed and is characterized by a relatively abrupt rise of the crystal content in the suspension. In hydraulic washing columns, this buildup front is also referred to as the filtration front.

At the opposite end of the crystal bed to the buildup front, a type of rotor blade (for example a slotted rotating knife disk) or scraper is usually disposed which continuously removes crystals from the crystal bed. The continuous accumulation of crystals on the buildup front on the one hand and the continuous removal of crystals from the end of the crystal bed opposite to the buildup front on the other hand defines the transport direction of the crystal bed (it may be either from the top downward or from the bottom upward). The crystals removed from the crystal bed are, optionally after resuspension in pure melt, melted by heat transfer. A portion of the melt is removed as the pure product stream and another portion of the pure melt is recycled into the process chamber as washing liquid against the transport direction of the crystal bed at its opposite end to the buildup front. Customarily, the washing liquid is at the melting point temperature.

However, a portion of the crystals may also be melted immediately within the washing column (for example using appropriate installed devices for heating at the end of the process chamber opposite to the buildup front).

In this case, only a portion of the melt generated is likewise withdrawn from the column. The other portion rises as washing melt.

The conveyance of the pure melt in the opposing direction to the conveyance of the crystal bed causes the crystal bed saturated with mother liquor to be virtually forced into the pure melt and the mother liquor in the crystal bed to actually be forced back to a certain extent by the pure melt.

In the steady state, the result of this process is a washing front at a defined height of the crystal bed, and the washing front is defined as that location in the process chamber in the washing column where the temperature and concentration gradients are highest (the temperature jumps in the washing front, the temperatures are substantially constant above and below the washing front). Roughly speaking, pure melt and mother liquor border one another within the washing front. The region from the washing front to the buildup front is referred to as the mother liquor zone and the region from the washing front to the end of the crystal bed opposite to the buildup front is referred to as the pure melt zone. The position of the washing front may be adjusted by regulating the transported crystal mass stream and the opposing pure melt stream. It is frequently the case that the washing effectiveness increases with increasing length of the pure melt zone.

The cross section of the process chamber of the washing column may be circular, oval or angled (for example a regular polygon). The materials for the wall bounding the process chamber of the washing column specified by EP-A 83463 are synthetic plastics and glass. EP-A 83463 considers it essential for a stable washing front that the abovementioned wall material have a very low thermal conductivity in order to suppress a heat flux out of the process chamber of the washing column or into the washing column. EP-A 83463 considers the heat conductivity even of glass as too high and in this case recommends the additional cladding of the process chamber wall with insulating materials.

However, a disadvantage of the above prior art recommendations is that the materials recommended are not easy to work with and, in particular in the case of glass, can only be subjected to moderate mechanical stress. This is a disadvantage in particular when the washing column has a large diameter and/or is operated at elevated pressure.

It is an object of the present invention to provide a process as described at the outset in which the boundary wall of the process chamber is manufactured from metal and which can nevertheless be operated satisfactorily.

Results of ongoing research have shown that it is not essential to the task that the recommendation of EP-A 83463 be followed and heat fluxes into the process chamber be suppressed by insulating measures, even though the thermal conductivity of metals is even more marked than that of glass.

A reason for this finding is the fact that the melting point of a pure substance is at a higher temperature than the melting point of the same substance which contains impurities (keyword: freezing point depression). The consequence of this fact is that the temperature in the mother liquor is normally below the temperature in the pure melt zone. Depending on the impurity content of the mother liquor, this temperature difference may be up to 15° C. and more, frequently from 4 to 10° C., and, when the impurity content of the mother liquor is low, from 2 to 4° C.

As a consequence of the high thermal conductivity of metals, this leads to the metal wall encasing the process chamber conducting heat from the pure melt at a higher temperature to the mother liquor zone at a lower temperature. The result may be undesired crystal formation on the side of the metal wall facing toward the process chamber along the length of the pure melt zone, which reduces the throughput through the washing column owing to increased friction losses or increases the pressure drop. Insulating measures according to EP-A 83463 may increase the effect.

We have found that the object is achieved by a process for purifying removal of crystals from their suspension in mother liquor, in which the suspension is fed to a washing column which has a wall which encloses a process chamber, mother liquor from the suspension fed into the process chamber is passed out of the process chamber while holding back the crystals and forming a crystal bed in the process chamber, the crystal bed is conveyed within the process chamber, at least one force other than gravity acts in the process chamber in the conveying direction of the crystal bed and conveys the crystal bed within the process chamber, pure melt comprising molten crystals which have been purifyingly removed by the process according to the invention is conducted in the process chamber in countercurrent to the crystal bed in such a manner that a washing front forms in the crystal bed which divides the crystal bed into a mother liquor zone and a pure melt zone, wherein the wall is a metal wall which, on its side facing away from the process chamber, is heated at least along the length of the pure melt zone.

Heating means that the temperature of the contact area of the length of metal wall on the side facing away from the process chamber is higher than the temperature of the contact area of the length of metal wall on the side facing toward the process chamber so that a heat flux flows from the outside to the inside. The latter temperature is normally the melting temperature of the pure melt along the length of the pure melt zone.

Depending on the substance to be purified, the metals may be metals of different types. They may be pure metals, but also alloys, for example carbon steels, iron-based alloys (stainless steel, for example with Cr/Ni addition) or nickel-based alloys (for example Hastelloy qualities). When the substance to be purifyingly removed is acrylic acid, the wall material is preferably stainless steel, in particular stainless steel 1.4571. The thickness of the metal wall bounding the process chamber is advantageously from 3 to 30 mm, frequently from 4 to 20 mm and usually from 5 to 15 mm. The latter applies in particular to the case of stainless steel.

Preference is given according to the invention to washing columns having a cylindrical process chamber. Their diameter is generally $\geq 25$ cm, usually $\geq 50$ cm. Customarily, the diameter will not exceed 3 m. Diameters of from 1 m to 2 m are advantageous from a process engineering point of view.

Preference is otherwise given according to the invention to using hydraulic washing columns, as described in DE-A 10156016, DE-A 10017903, DE-A 10036880 and DE-A 10036881.

For the purposes of the process according to the invention, it is not disadvantageous when the metal wall is additionally heated along the length of the mother liquor zone on the side facing away from the process chamber.

It is possible to realize the procedure according to the invention in a particularly simple manner by encasing the washing column as such and maintaining the air between the casing and the metal wall by means of heating at a temperature which is above the melting point of the pure melt withdrawn from the washing column. The material used for the casing of the washing column may in the simplest case be wood. Other materials such as plastic, sheet metal, brickwork or concrete are also possible.

Customarily, it is sufficient for the purposes of the process according to the invention for a temperature difference between the melting point of the pure melt withdrawn and gas temperature (for example air temperature) in the surrounding casing to be from 0.5 to 5° C. However, this temperature difference may also be up to 20° C. or more.

However, the specific heat flux introduced into the process chamber of the washing column via the metal wall should not be more than 500 W/m². If this limit is exceeded, it will generally result in undesired melting processes which reduce the purifying effect of the process according to the invention. In other words, the abovementioned temperature difference should normally not exceed 80° C., usually 50° C. and generally 30° C. Advantageous specific heat fluxes according to the invention are up to 200 W/m², preferably from 10 to 100 W/m² and most preferably from 10 to 50 W/m² (in each case along the length of the pure melt zone).

When the crystals to be removed according to the invention are crystals of acrylic acid, air temperatures in the casing of the washing column manufactured from stainless steel of from 14 to 35° C., frequently from 14 to 25° C., sometimes from 14 to 20° C., have proven advantageous when the melting point of the pure melt is about 13° C.

The heating required according to the invention may also be effected by providing the washing column along a certain section of the process chamber length (at least along the length of the pure melt zone) with a double jacket, or a half-pipe coil, or secondary heating pipes or lines placed in contact and passing a heatable liquid or heated gas through them.

Alternatively, electrical heating (for example heating wires or heating mats) may be applied. In other words, in the case of a double jacket method, the metal wall bounding the process chamber is surrounded along a certain length by a second wall (which advantageously consists, but does not have to consist, of the same material) and the heating liquid or heating gas is conducted in the intermediate space. When heating liquids are used, the temperature should normally not be more than 10° C., in general not more than 5° C., above the melting temperature of the pure melt. The above also applies to gases. In hydraulic washing columns, it may be advantageous to heat the process chamber wall along its length starting from the height of the crystal removal blade to the height of the beginning or the end of the filter.

It may also be advantageous to heat along this length with a liquid and, along the remaining length of the process chamber, to use a gas for heating. It will be appreciated that any other two-zone heating may be applied.

The process according to the invention is advantageous in particular in the case of washing columns whose separating performance is $\geq 0.5$ metric ton/h, preferably $\geq 1$ metric ton/h. In general, the separating performance will not be more than 15 metric tons/h. Typical values are from 2 to 10 metric tons/h. In FIGS. 1 to 4, the numbers have the following meanings:

1: suspension
2: residual melt (mother liquor)
3: product (molten pure crystals)
4: impure residual melt
5: moving crystal bed
6: washing liquid (melt)
7: washing column
8: suspension pump
9: heat transferer to melt the crystals
10: regulating valve to adjust the mass ratio of washing liquid (melt)/product
11: circulation pump of the melt circuit
12: melt circuit
13: stirrer
14: filter tube
15: filter
16: rotating blade for resuspending the washed crystals
17: oscillating flask having filtering end surface and residual melt outlet
18: pitched-blade rotor for the transport of the crystal bed
19: cylindrical displacer According to the invention, pulsed washing columns may also be used or the washing column may be operated with pulsed streams, as described in EP-A 97405. As already mentioned, the process according to the invention is suitable in particular for purifying removal of acrylic acid crystals from their suspension in contaminated acrylic acid melts, as described in WO-0177056.

These are suspensions which are obtainable, for example, by suspension crystallization of crude acrylic acid, which comprise $\geq 70$% by weight of acrylic acid,
up to 15% by weight of acetic acid,
up to 5% by weight of propionic acid,
up to 5% by weight of low molecular weight aldehydes,
up to 3% by weight of polymerization inhibitors and
up to 5% by weight of acrylic acid oligomers (Michael adducts).

However, the process according to the invention is also suitable in the case of other crystal suspensions, as described, for example, in EP-A 97405 using xylene crystal suspensions. It is also advantageous in the case of N-vinylpyrrolidone and methacrylic acid crystal suspensions.

Figure 5:
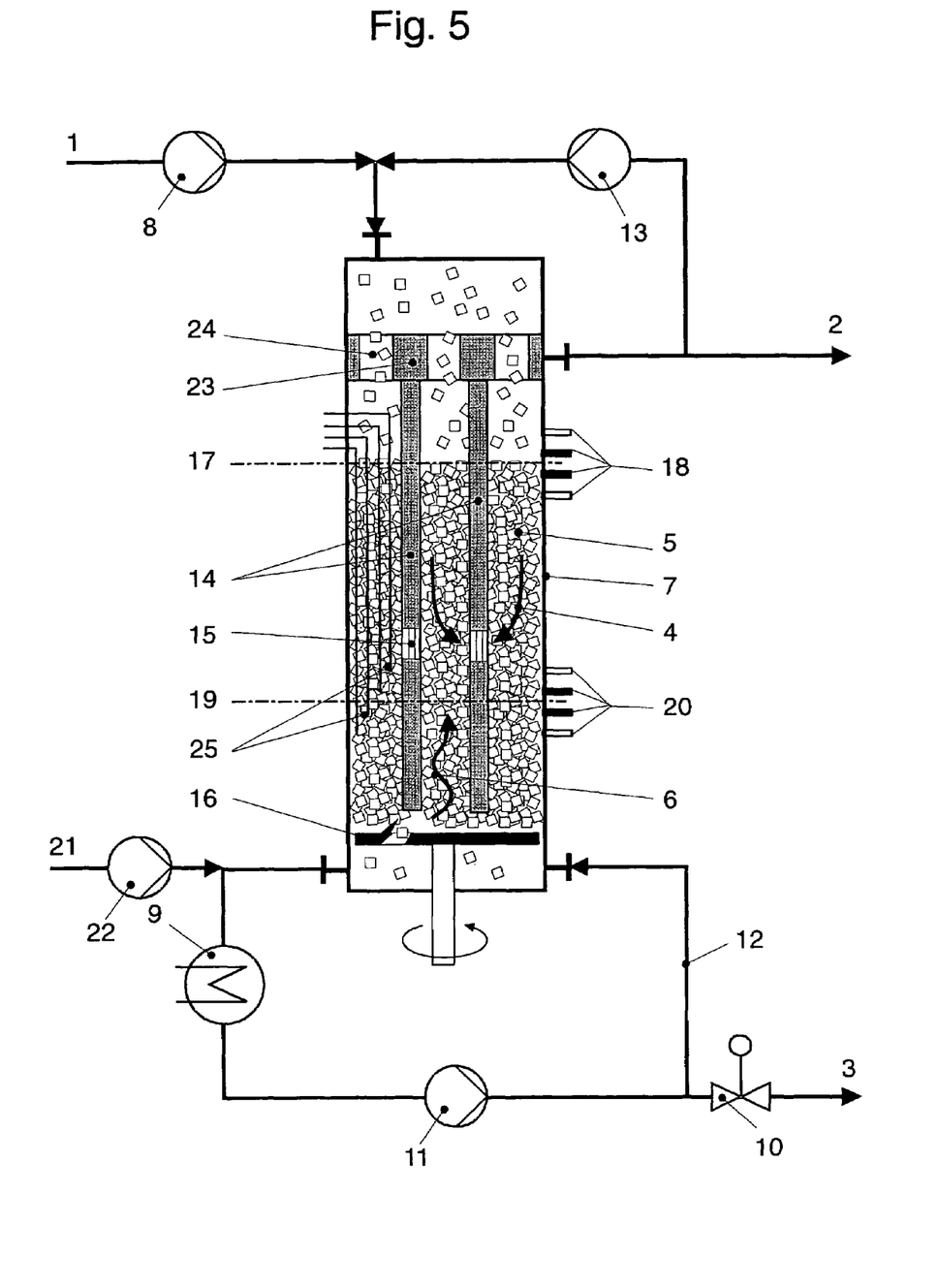

FIG. 5 accompanying this document shows a schematic of the construction of a hydraulic washing column typically suitable for the process according to the invention. It is elucidated in more detail hereinbelow using the example of a purifying removal of acrylic acid crystals.

The suspension (1) of acrylic acid crystals in mother liquor which is withdrawn from the suspension crystallizer is fed by means of a pump (8) and/or by hydrostatic head under subatmospheric pressure into the washing column (7). In the upper section of the washing column there is a fluid register which fulfils two functions. The suspension is distributed over the cross section of the washing column via openings (24) from the upper to the lower column section. The continuous interior of the fluid register (23) serves as a collector for the removed liquids (mother liquor and washing liquid (2)). Drainage pipes (14) are mounted at the bottom of the fluid register (they have a constant cross section within the concentration zone; from the point of view of the suspension feed, this is the zone up to the first filter) which are connected to the interior (23). The drainage pipes are provided with at least one conventional filter (15) each at a defined height, through which the mother liquor (4) is removed from the washing column (the mother liquor may be under atmospheric pressure, elevated pressure or reduced pressure). A compact crystal bed (5) forms. The crystal bed is transported, by the force resulting from the hydraulic flow pressure drop of the mother liquor, past the filters into the washing zone below the filters. The recycling of a portion of the mother liquor into the column by means of the flow control pump (13) allows the regulation of this transport force. Variations of the crystal content in the suspension fed in or changes in the crystal size distribution, which substantially influences the flow pressure drop, may thus be compensated for Such variations are recognizable by the change in location of the filtration front (17), which may be determined by optical position detectors (18).

At the lower end of the washing column, the crystals are removed from the crystal bed by means of a rotor blade (16) and resuspended in pure product melt which may be overinhibited using p-methoxyphenol (MEHQ) as a polymerization inhibitor. This suspension is conducted within a melt circuit (12) via a heat exchanger (9) which indirectly introduces the heat required to melt the crystals. From about 70 to 80% by weight, in favorable cases (for example in the event of marked recrystallization) even from >80 to 100% by weight, of the molten crystals are removed from the melt circuit as pure product (3). The amount of pure product removed is adjusted via the product regulating valve (10). The remaining portion of the pure product melt flows as a washing medium (6) against the transport direction of the crystal bed to the filters (15), which effects countercurrent washing of the crystals in the washing zone. The purification of the crystals is substantially based on the displacement and dilution of the mother liquor in the voids of the crystal bed. The dilution effect is based on mixing in the voids between the crystals through which flow occurs and diffusion in the contact points through which flow does not occur, i.e. the boundary layer of the crystals close to the surface.

In steady-state operation, the washing front (19) is established at a defined height in the washing zone. At the height of the washing front, the concentration transition of mother liquor concentration (above the washing front) and pure melt concentration (below the washing front) takes place. To achieve an adequate purifying effect, the washing front (19) has to be positioned at a minimum height above the rotor blade (16). The position (19) is established as a dynamic equilibrium between transported crystal mass flow (5) and washing medium stream (6) conducted in countercurrent, and lies below the filter. The amount of washing medium results from the amount of pure product removed.

When the crude acrylic acid is already comparatively pure, the crystallization temperature in the suspension crystallizer is only from 1 to 4° C. below the pure product melting point. When temperature equalization occurs between the cold crystals and the washing liquid in the region of the washing front, there is therefore only a limited extent of recrystallization of the washing liquid. This limits both the recovery of washing melt by recrystallization and the reduction of the porosity of the crystal bed below the washing front by recrystallization. Such a low crystal bed porosity would reduce both the washing medium demand and recovery by recrystallization.

When the purity of the crude acrylic acid is good, it is further advantageous to feed the storage stabilizer methoxyphenol (MEHQ) into the melt circuit (12) of the washing column. To this end, MEHQ dissolved in pure product is added to the melt circuit at melting temperature of the latter using a metering pump (22) for stabilization.

To ensure stable operation of the hydraulic washing column for the purposes of a defined space-time yield and a constant good purifying effect, it is advantageous to compensate for external interfering factors such as
- variations in the suspension quantity,
- changes in the crystal content in the suspension,
- variation in the crystal size distribution and
- concentration variations in the feed and/or the mother liquor by the regulation of a) the filtration front (FIG. 5, number 17),
b) the specific washing medium quantity (FIG. 5, number 6) and
c) the heat of melting (FIG. 5, number 9).

Apart from these, the numbers in FIG. 5 have the following meanings:

1=feed of the crystal suspension
2=mother liquor takeoff
3=pure acrylic acid product
4=internal mother liquor stream
5=moving crystal bed
6=washing melt
7=washing column
8=suspension pump
9=heat transferer for melting the crystals
10=regulating valve for adjusting the mass ratio of washing melt/pure acrylic acid product takeoff
11=circulation pump of the melt circuit
12=melt circuit
13=control stream pump
14=drainage pipe for mother liquor and washing liquid
15=filter
16=rotor blade for resuspending the washed crystals
17=filtration front (upper limit of crystal bed)
18=detection of the filtration front (4 optical reflection sensors)
19=washing front (concentration transition between pure and impure liquid phase)
20=detection of the washing front (4 optical reflection sensors)
21=inhibitor solution (MEHQ in pure acrylic acid product)
22=metering pump for the inhibitor solution
23=fluid register: collecting tray for mother liquor and washing liquid
24=fluid register: distributor plate for the crystal suspension
25=detection of the washing front (4 temperature sensors)

EXAMPLES AND COMPARATIVE EXAMPLES

Example 1

Fractional condensation of a product gas mixture of a two-stage heterogeneously catalyzed gas phase partial oxidation of propene provided in the side stream of a fractional condensation column 1.5 t per hour of crude acrylic acid which had the following composition:

| | |
|---|---|
| acrylic acid | 96.1% by weight |
| acrolein | 446 ppm by weight |
| allyl acrylate | 20 ppm by weight |
| diacrylic acid | 3764 ppm by weight |
| acetic acid | 7460 ppm by weight |
| furfural | 6719 ppm by weight |
| benzaldehyde | 7131 ppm by weight |
| propionic acid | 751 ppm by weight |
| phenothiazine | 91 ppm by weight |
| MEHQ | 247 ppm by weight |
| water | 0.83% by weight |

Continuous addition of 22.5 kg/h of water to the crude acrylic acid increased its water content to 2.3% by weight and it was then fed at a temperature of 20° C. to a suspension crystallizer. The crystallizer used was a cooling disk crystallizer (manufacturer: GMF, The Netherlands) having 7 cooling disks of diameter 1.25 m and capacity of about 2500 l. The cooling medium used was a water/glycol mixture (70/30% by volume) which was passed through the cooling disks. As the melt proceeded through the crystallizer, it was cooled to 8° C. and about 24% by weight of crystals formed, based on the total mass of suspension.

A portion of this suspension was passed continuously via a rotary piston pump (whose rotation rate was regulated) to a hydraulic washing column. This washing column had a cylindrical process chamber of internal diameter 263 mm and had a metal wall bounding the process chamber made of stainless steel 1.4571 of thickness 5 mm. For the liquid takeoff, a centrally installed filter pipe (of the same stainless steel) having an external diameter of 48 mm (wall thickness=2 mm) was used in the washing column. The length of the process chamber was 1230 mm. The length of the filter pipe was 1225 mm. The filter length was 60 mm. The filter was installed at a pipe length of 970 mm (measured from above). The crystal removal at the lower end of the washing column was effected using a rotating blade (60 rpm). The transport direction was from the top downward.

The removed crystals were resuspended in a melt circuit which was operated at 14° C. (melting point of the purifyingly removed crystals). The polymerization inhibitors MEHQ and air were introduced (by bubbling) into the circulated suspension (278 ppm by weight of MEHQ). Using a heat exchanger, heat was introduced indirectly into the circulated suspension in order to substantially melt the crystals resuspended therein. The pump used in the melt circuit was a centrifugal pump (1500 rpm) having a double-action slip-ring seal. The working fluid used was a water/glycol mixture (85/15% by volume) which was cooled indirectly with cooling water. In order to obtain better acrylic acid exchange in the region of the slip-ring seal of this pump, a rinsing line was provided from the pressure side of the pump to the product space surrounding the slip-ring seal, and operated continuously and openly. The position of the washing front in the column was monitored by more than one temperature measurer installed at different axial heights in the washing column and regulated while maintaining the amount of pure product removed from the melt circuit at an appropriate level. The crystal bed height was controlled via four optical sensors mounted at different heights on the washing column while maintaining the control stream at an appropriate level. The control stream pump used was likewise a rotary piston pump (whose rotation rate was regulated), although a circulation pump having a regulating valve could also have been used.

The washing column was accommodated in a housing manufactured from wooden boards, and the air between the metal wall of the column and the wooden wall was heated in such a manner that the air temperature in the overall housing was in the region from 15 to 18° C. (measured at ten representative measuring points).

The washing column was charged with a suspension amount of 1400 kg/h from the cooling disk crystallizer. The temperature of the suspension was 8° C. An overpressure against the atmosphere of from 2.0 to 2.2 bar was attained at the top of the washing column, and this varied within narrow limits about the average of 2.05 bar. The overpressure at the lower end of the column was from 1.8 to 2.0 bar. A control stream pump was used to recycle a control stream of 1400 kg/h to the washing column in order to adjust the crystal bed height.

The pure product stream of purified acrylic acid removed from the melt circuit was from 310 to 340 kg/h (i.e. average=325 kg/h). This corresponds to a yield of 96.7% by weight, based on the crystal mass stream fed to the washing column with the suspension. The pure product had the following composition:

| | |
|---|---|
| acrylic acid | 99.75% by weight |
| acrolein | not detectable |
| allyl acrylate | not detectable |
| acetic acid | 1457 ppm by weight |
| furfural | 3 ppm by weight |
| benzaldehyde | 2 ppm by weight |
| propionic acid | 209 ppm by weight |
| phenothiazine | not detectable |
| MEHQ | 278 ppm by weight |
| water | <0.05% by weight |

During the entire experiment, the washing front had satisfactory stability.

Comparative Example 1

The procedure of example 1 was repeated. However, the air temperature in the housing was in the range from 9 to 11° C. The washing column was initially likewise charged with a crystal suspension of 1400 kg/h and a control stream of 1400 kg/h. With increasing operating time, an overpressure of 4.1 bar which increased at an increasing rate was attained at the top of the washing column (after 2.5 h). The overpressure at the lower end of the washing column rose to 2.7 bar. The amount of pure product removed while maintaining the position of the washing front fell on average to 307 kg/h. This corresponds to a yield of 91.4%, based on the crystal mass stream fed to the washing column with the suspension.

In order to limit the pressure rise in the washing column, the amount of crystal suspension fed in was reduced to 1300 kg/h and the control stream was increased to 1475 kg/h (in order to reduce the length of the crystal bed). The overpressures initially fell, only then to increase again (despite reduced feed rate) to 3.5 bar (upper end) and 2.5 bar (lower end).

While maintaining the position of the washing front, the amount of pure product withdrawn fell to an average of about 290 kg/h. The product purity was substantially unchanged.

By increasing the air temperature in the housing to the values according to example 1, the working pressures in the washing column could be returned to the level according to example 1 and the amount of pure product withdrawn could be increased to values of above 325 kg/h.

Example 2

Fractional condensation of a product gas mixture of a two-stage heterogeneously catalyzed gas phase partial oxidation of propene provided 1.5 t per hour of crude acrylic acid in the side stream of a fractional condensation column which had the following composition:

| | |
|---|---|
| acrylic acid | 96.72% by weight |
| acrolein | 390 ppm by weight |
| allyl acrylate | 19 ppm by weight |
| diacrylic acid | 3602 ppm by weight |
| acetic acid | 6873 ppm by weight |
| furfural | 6436 ppm by weight |
| benzaldehyde | 6264 ppm by weight |
| propionic acid | 718 ppm by weight |
| phenothiazine | 80 ppm by weight |
| MEHQ | 239 ppm by weight |
| water | 0.82% by weight |

Continuous addition of 15 kg/h of water to the crude acrylic acid increased its water content to 1.7% by weight and it was then fed at a temperature of 19° C. to the suspension crystallizer from example 1. As the melt proceeded through the crystallizer, it was cooled to 8.4° C. and about 27% by weight of crystals formed, based on the total mass of suspension.

A portion of this suspension was passed continuously via a rotary piston pump (whose rotation rate was regulated) to a hydraulic washing column of the same size and same process space wall material as in example 1. However, in contrast to example 1, the washing column was provided with six filter candles (external diameter of each=34 mm) and with a jacket (of the same material as the process chamber wall) which extended from the height of the crystal removal blade to the height of the filter. The jacketed space served the purpose of heating by means of a heatable water/glycol mixture (70/30% by volume) in this region. Above the heating jacket, the washing column, as in example 1, was surrounded by the wooden housing whose air contents were maintained at a temperature of from 15 to 17° C.

The water/glycol mixture was passed to the heating jacket at a temperature of 15° C. and in an amount of 1.6 m³/h. The washing column was charged with an amount of crystal suspension of 1400 kg/h from the cooling disk crystallizer.

An overpressure of from 2.2 to 2.5 bar against the atmosphere was attained at the top of the washing column. The overpressure at the lower end of the column was from 1.9 to 2.1 bar. A control stream of 1600 kg/h was returned to the washing column via the control stream pump in order to adjust the crystal bed height. An average pure product stream of 368 kg/h of purified acrylic acid was removed from the melt circuit which was operated as in example 1, which corresponds to a yield of 97.4%, based on the crystal mass stream fed to the washing column with the suspension. The pure product had the following composition:

| | |
|---|---|
| acrylic acid | 99.75% by weight |
| acrolein | not detectable |
| allyl acrylate | not detectable |
| acetic acid | 1420 ppm by weight |
| furfural | 2 ppm by weight |
| benzaldehyde | 2 ppm by weight |
| propionic acid | 215 ppm by weight |
| phenothiazine | not detectable |
| MEHQ | 236 ppm by weight |
| water | <0.06% by weight |

Comparative Example 2

As example 2, except that the temperature of the water/glycol mixture was maintained at 12° C. The same problems occur as in comparative example 1.

Comparative Example 3

As example 2, except that the jacketed space was substantially evacuated.

The same problems occurred as in comparative example 1.

We claim:

1. A process for purifying removal of crystals from their suspension in mother liquor, in which the suspension is fed to a washing column which has a wall which encloses a process chamber, and which wall on its side facing away from the process chamber contacts a first contact area and on its side facing towards the process chamber contacts a second contact area, mother liquor from the suspension fed into the process chamber is passed out of the process chamber while holding back the crystals and forming a crystal bed in the process chamber, the crystal bed is conveyed within the process chamber, at least one force other than gravity acts in the process chamber in the conveying direction of the crystal bed and conveys the crystal bed within the process chamber, pure melt comprising molten crystals which have been purifyingly removed by the process claimed is conducted in the process chamber in countercurrent to the crystal bed in such a manner that a washing front forms in the crystal bed which divides the crystal bed into a mother liquor zone and a pure melt zone, wherein the wall is a metal wall which, on its side facing away from the process chamber, is heated at least along the length of the pure melt zone, such that the temperature of the first contact area of said length of the metal wall on its side facing away from the process chamber is higher than the temperature of the second contact area of said length of the metal wall on its side facing toward the process chamber, so that a heat flux flows from the outside of the process chamber through the wall to the inside of the process chamber, and wherein realization of heating comprises encasing the washing column and maintaining a gas in the casing at a temperature above the pure melt temperature.

2. A process as claimed in claim 1, wherein the crystals to be purifyingly removed are crystals of acrylic acid, xylene, methacrylic acid or N-vinylpyrrolidone.

3. A process as claimed in claim 2, wherein the metal wall is manufactured from stainless steel, carbon steel or a nickel-based alloy.

4. A process as claimed in claim 1, wherein the metal wall is manufactured from stainless steel, carbon steel or a nickel-based alloy.

5. A process as claimed in claim 1, wherein the washing column is a hydraulic washing column.

6. A process as claimed in claim 1, wherein the heating conducts a specific heat flux of from 10 to 100 $W/m^2$ into the pure melt zone.

* * * * *